(12) United States Patent
Thiele et al.

(10) Patent No.: US 10,992,229 B2
(45) Date of Patent: Apr. 27, 2021

(54) COMPARATOR WITH PREAMPLIFIER GAIN ADJUSTMENT BASED ON OVERDRIVE VOLTAGE

(71) Applicant: TEXAS INSTRUMENTS INCORPORATED, Dallas, TX (US)

(72) Inventors: Gerhard Thiele, Dachau (DE); Manuel Wiersch, Freising (DE); Antonio Priego, Freising (DE); Johann Erich Bayer, Thonhausen (DE); Stefan Herzer, Marzling (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/655,876

(22) Filed: Oct. 17, 2019

(65) Prior Publication Data

US 2020/0127570 A1 Apr. 23, 2020

Related U.S. Application Data

(60) Provisional application No. 62/746,903, filed on Oct. 17, 2018.

(51) Int. Cl.
*H02M 3/156* (2006.01)
*H02M 1/00* (2006.01)
*H02M 3/158* (2006.01)

(52) U.S. Cl.
CPC .... *H02M 3/158* (2013.01); *H02M 2001/0025* (2013.01); *H02M 2001/0048* (2013.01); *H02M 2003/1566* (2013.01)

(58) Field of Classification Search
CPC ............... H02M 3/156; H02M 3/1563; H02M 2003/1566; H02M 2001/0025; H02M 2001/0054; H02M 2001/0032
See application file for complete search history.

(56) References Cited

U.S. PATENT DOCUMENTS

| | | | | |
|---|---|---|---|---|
| 6,608,521 B1* | 8/2003 | Baldwin | ............... | H02M 3/156 323/268 |
| 9,641,060 B2* | 5/2017 | Tang | ........................ | H02M 1/00 |
| 9,948,181 B2* | 4/2018 | Manohar | ............... | H02M 3/156 |
| 10,164,536 B2* | 12/2018 | Huang | ................ | H02M 3/1582 |
| 10,256,728 B1* | 4/2019 | Couleur | .................. | H02M 1/08 |
| 2008/0150500 A1* | 6/2008 | Gurcan | ................. | H02M 3/156 323/271 |
| 2012/0013315 A1* | 1/2012 | Popescu | ................. | H02M 3/156 323/268 |
| 2013/0015830 A1* | 1/2013 | Zhang | .................. | H02M 3/1588 323/282 |
| 2013/0293211 A1* | 11/2013 | Chen | ................... | H02M 3/1588 323/282 |

(Continued)

*Primary Examiner* — Thienvu V Tran
*Assistant Examiner* — Sisay G Tiku
(74) *Attorney, Agent, or Firm* — Lawrence J. Bassuk; Charles A. Brill; Frank D. Cimino

(57) ABSTRACT

An electrical system includes: 1) a buck converter; 2) a battery coupled to an input of the buck converter; and 3) a load coupled to an output of the buck converter. The buck converter includes a high-side switch, a low-side switch, and regulation loop circuitry coupled to the high-side switch and the low-side switch. The regulation loop circuitry includes a comparator with preamplifier gain adjustment circuitry configured to adjust a preamplifier gain of the comparator based on an overdrive voltage.

22 Claims, 8 Drawing Sheets

(56) References Cited

U.S. PATENT DOCUMENTS

| | | | | |
|---|---|---|---|---|
| 2014/0132232 A1* | 5/2014 | MacLean | ................... | G05F 1/62 |
| | | | | 323/271 |
| 2014/0239934 A1* | 8/2014 | Zhang | ................... | H02M 3/156 |
| | | | | 323/299 |
| 2014/0320104 A1* | 10/2014 | Guo | .................... | H02M 3/1588 |
| | | | | 323/290 |
| 2017/0047843 A1* | 2/2017 | Bawa | .................... | H02M 3/156 |
| 2018/0097449 A1* | 4/2018 | Kim | ................... | H02M 3/33592 |
| 2020/0106360 A1* | 4/2020 | Priego | ................. | H02M 3/1582 |

\* cited by examiner

COMPARATOR WITH PREAMPLIFIER GAIN ADJUSTMENT BASED ON OVERDRIVE VOLTAGE

CROSS-REFERENCE TO RELATED APPLICATIONS

This application claims priority to U.S. Provisional Application No. 62/746,903, filed Oct. 17, 2018, which is hereby incorporated by reference.

BACKGROUND

There are different control methods to regulate the output voltage in a switching converter. FIG. 1 shows a switching converter with an example buck converter topology. In the example of FIG. 1, a Comparator (Comp) is used to monitor the output voltage (VOUT). More specifically, the inputs of the Comp include VOUT and a reference voltage (VREF). The output of Comp is coupled to the Control Logic, and the output of the Control Logic is coupled to the input of the Gate Driver. The Gate Driver controls the on- and off-state of the power switches, M_HS and M_LS. The Control Logic controls the three possible states of the power switches. The first state is the on-phase in which M_HS is on and M_LS is off, the second state is the off-phase in which M_HS is off and M_LS is on, and the last state is the pause state in which both power switches are off.

Once VOUT drops below VREF a new switching cycle is initiated starting with the on-phase to bring up VOUT. The state to bring up VOUT is called the active state. In this state, the Comp is biased with a dynamic current, $I_{BIAS}$, in the uA range to minimize its propagation delay and ensure the required switching frequency. However, at light load the buck converter enters the pause state once VOUT is above the reference. The efficiency at light load depends on the average quiescent current of the switching converter. As the Comp is one of the main contributors to the total quiescent current of the switching converter its bias current gets reduced in the pause state. In general, the total current consumption of the Comp depends on the difference between the two inputs. If there is a high voltage difference at its inputs, then the total current consumption can be significantly higher resulting in a decreased efficiency (e.g., output voltage ripple at light load if a small output capacitor is used). Efforts to improve power efficiency of the Comp at light loads are ongoing.

SUMMARY

A new comparator (Comp) topology for a buck converter is presented. The new Comp topology includes a preamplifier gain that is adjusted depending on the overdrive voltage of the Comp. In the proposed Comp topology, a second stage is connected to the first stage. Depending on the preamplifier gain, the bias current in the second stage can be significant at higher overdrive voltages at the input of the Comp. With the proposed Comp topology, the preamplifier gain is adjusted to achieve a lower quiescent current at light loads. Furthermore, it also improves the load transient performance of a buck converter in pause state and even in active state compared to buck converters without a Comp having a preamplifier gain adjustment feature.

BRIEF DESCRIPTION OF THE DRAWINGS

For a detailed description of various examples, reference will now be made to the accompanying drawings in which.

DETAILED DESCRIPTION

Disclosed herein are comparator topologies with a preamplifier gain adjustment feature. The proposed comparator topologies are used with buck converters having regulation loop circuitry that includes a comparator, where the preamplifier gain of the comparator is adjusted depending on the overdrive voltage (the difference between the feedback voltage and the reference voltage) of the comparator. A buck converter with the proposed comparator achieves a lower quiescent current at light loads and faster load transient response compared to buck converters without the comparator's preamplifier gain adjustment feature. To provide a better understanding, FIGS. 2-8 are presented herein to describe and compare comparator topologies with and without the proposed preamplifier gain adjustment feature and related issues.

Figure 1:
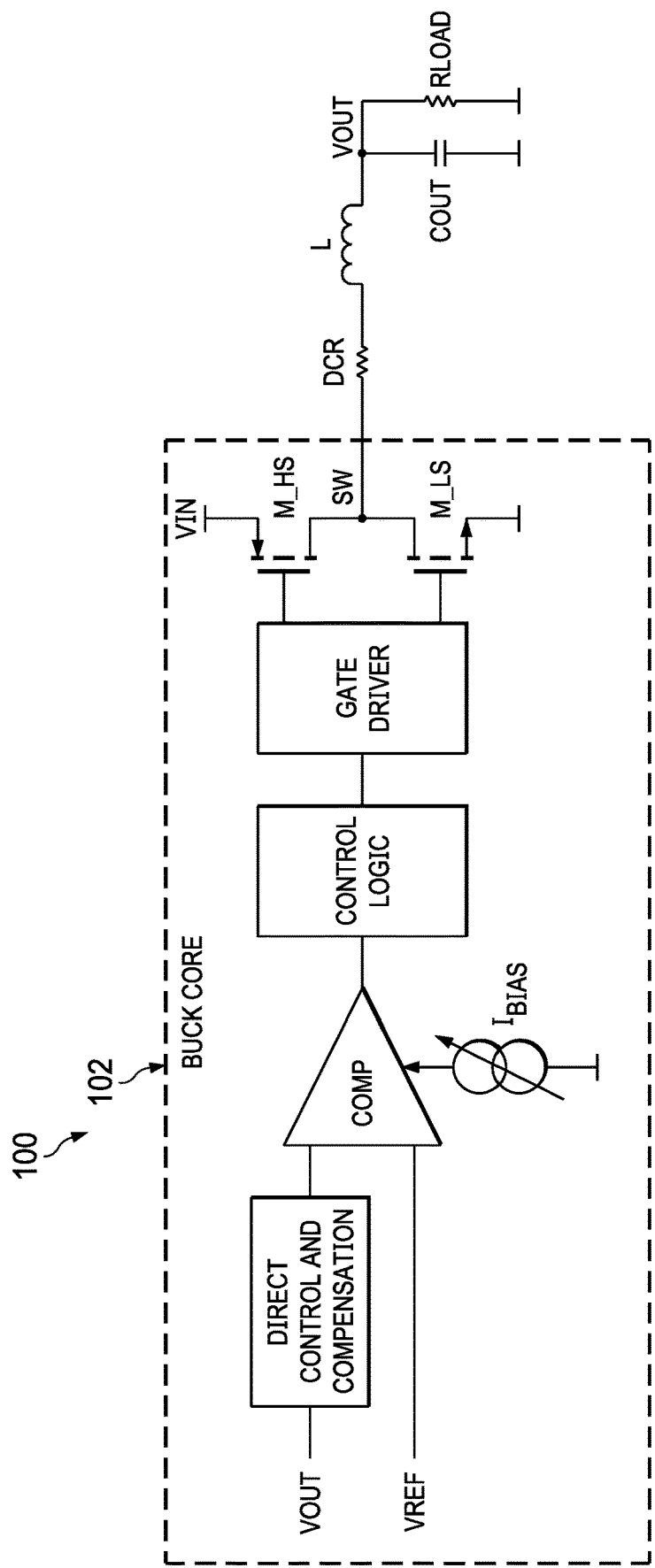
FIG. 1 is a diagram showing a buck converter.
Figure 2:
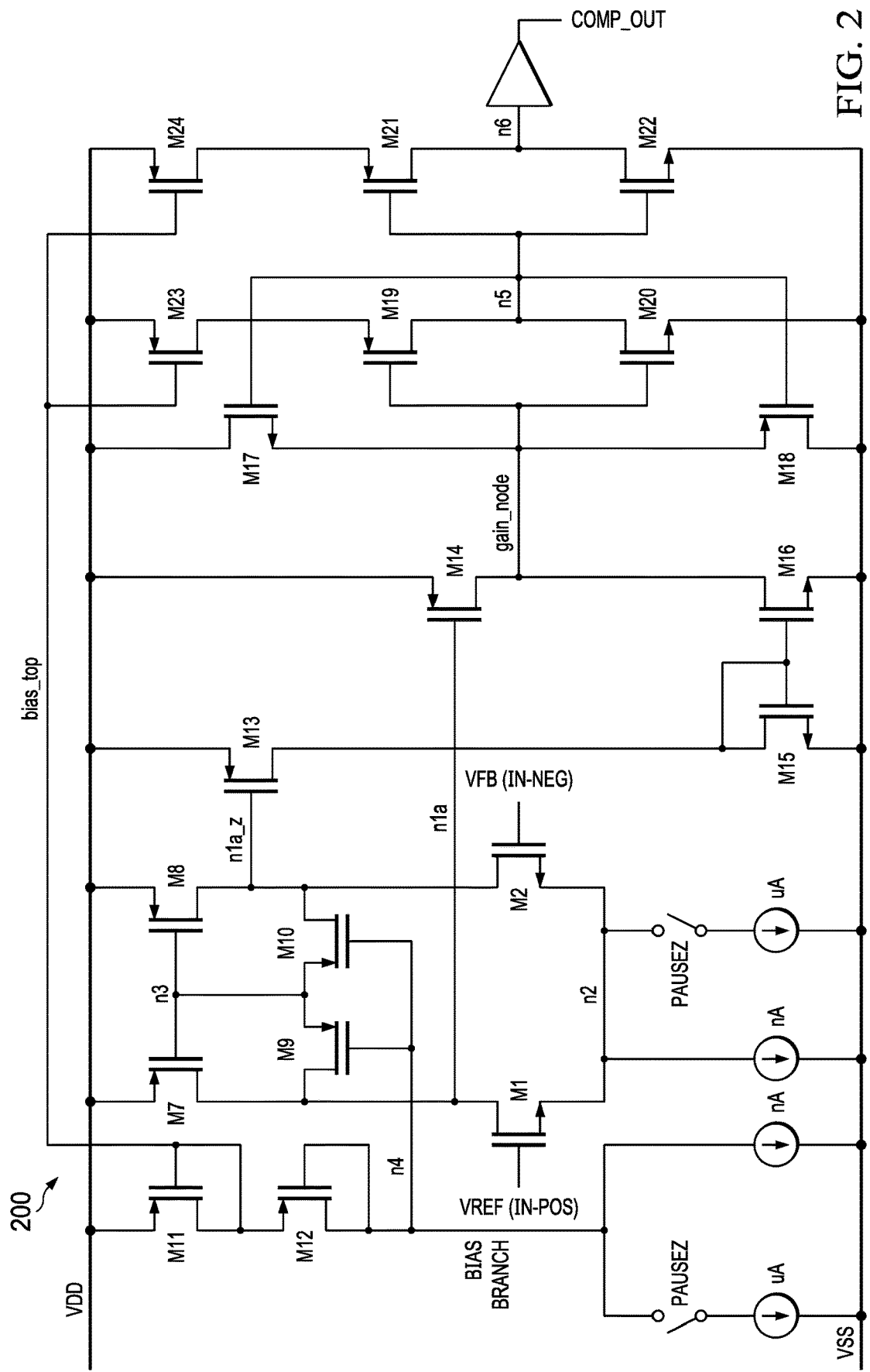
FIG. 2 is a schematic diagram showing a comparator topology without a preamplifier gain adjustment feature.

FIG. 2 is a schematic of a comparator ("Comp") without the proposed preamplifier gain adjustment feature. In the example of FIG. 2, the inputs of the Comp include the reference voltage (VREF) and the feedback voltage (VFB), which corresponds to VOUT. The gate voltage, n4, for transistors M9 and M10 is generated in a bias branch with a switchable bias current and transistors M11 and M12. By proper biasing of M9 and M10, these transistors operate in the "linear region" (the current of M9 is changing if its drain-source voltage changes) and can be considered as resistors with the value Ron.

The advantage of using M9 and M10 instead of resistors is that with proper biasing of M11 and M12 the preamplifier gain can be first order independent of the bias currents. That means that the preamplifier gain is similar if Comp is running with bias currents in the uA range or nA range. The preamplifier gain (Ap) at nodes n1a and n1a_z is Ap=gm*Ron, where gm is the transconductance of the input pair (M1 and M2) and where Ron is the total on resistance on nodes n1a and n1a_z, which is defined by Ron of M9 and M10. The transistors M13 and M14 are connected to the nodes n1a_z and n1a. If VFB is higher than VREF, then the voltage at n1a_z will drop and the current in M13 can increase significantly because it is not limited by any circuit. For a small voltage difference VFB>VREF at the Comp inputs, the current increase in M13 can be calculated in weak inversion as follows: $I_{DS}(M13)/I_0=\exp((VFB-VREF)/(n*26 mV))$ with $I_0$ as the drain-source current in M13 if the overdrive is 0V.

In the Comp, the transistors M17 and M18 are used to clamp the voltage at gain_node to reduce the propagation delay. With this clamping structure, the current that is flowing through M13 is mirrored by transistor M15 and M16 with M17 providing the current for M16 in case of clamping. If the Comp is biased in the nA-region then its propagation delay would increase by a factor of 4 to 10 without the clamping structure (M17 and M18).

At higher overdrive voltages (the difference between the feedback voltage and the reference voltage) there will be a significant voltage difference between the gate-source and drain-source voltages of M9 and M10. This will lead to different Ron values for M9 and M10 and therefore will increase the preamplifier gain in one branch and decrease it in the other branch—increasing the current in M13 or M14 even further (e.g. if the drain-source voltage of M9 or M10 reaches the region of the saturation voltage then its on resistance can increase by 10× or more). In addition to the increase in current consumption, the propagation delay increases due to the high voltage swing at n1$a$ and n1$a\_z$. Particularly, for bias currents in the nA-range it takes a long time until the nodes n1$a$ and n1$a\_z$ recover from the overdrive state.

Figure 3:
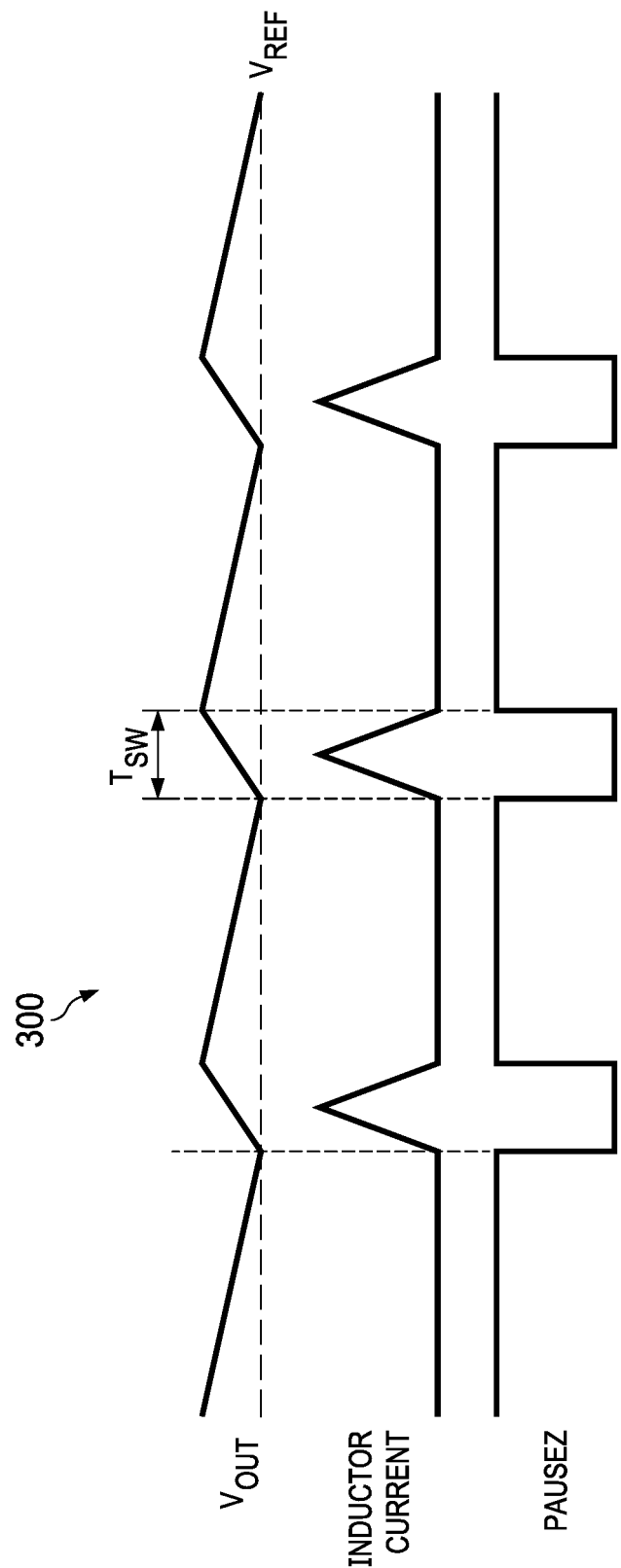
FIG. 3 is a timing diagram showing waveforms related to a buck converter topology with regulation loop circuitry in accordance with embodiments of the invention.

There are two scenarios where the input voltage difference is high and will significantly increase the current consumption and propagation delay of the Comp of FIG. 2. FIG. 3 shows the operation of the buck converter at light load. If VOUT drops below VREF, a switching cycle is initiated to increase the output voltage above VREF. When a switching cycle is initiated, PAUSEZ goes high. If PAUSEZ goes high, then Comp is running with a high bias current (also the resistors M9/M10 are biased with a high current to keep the preamplifier gain). At a very light load (peak inductor current significantly higher than the output current) the output voltage increase can be calculated as follows:

$$\Delta VOUT = \frac{I_{peak}}{2 * C_{OUT}} * T_{SW} = \frac{VIN - VOUT}{2 * C_{OUT} * L} * (T_{SW})^2 * D,$$

where $I_{peak}$ is the peak inductor current, $C_{OUT}$ is the output capacitor, $T_{SW}$ is the switching period, L is the inductor value, and D is the duty cycle. For the conditions $V_{IN}$=6V, $V_{OUT}$=3V, $C_{OUT}$=5 uF, $T_{SW}$=550 ns, and D=0.5, the output voltage ripple $\Delta V_{OUT}$ is 21 mV. In this scenario, Comp receives VOUT and VREF as inputs. If $\Delta$VOUT is 21 mV, then the overdrive voltage at the input of Comp is 21 mV too after the refresh cycle. At light load currents in the nano-ampere region this output voltage ripple would increase the quiescent current of Comp and therefore decrease the efficiency. If a load transient event happens at a high overdrive voltage (shortly after a refresh pulse), then the load transient performance suffers due to the high voltage difference between the nodes n1$a$ and n1$a\_z$.

For buck converters where VREF is equal to the targeted output voltage there is another issue in 100% mode. In 100% mode, where VIN equals VOUT, the amplifier that generates VREF enters in dropout and VREF falls by a few millivolt (VDROP) below VIN (VREF=VIN−VDROP). To avoid switching of the Comp in 100% mode (due to VREF being below the targeted output voltage), an offset voltage (VOFF) may be introduced at one input of the Comp (see FIG. 4).

Figure 4:
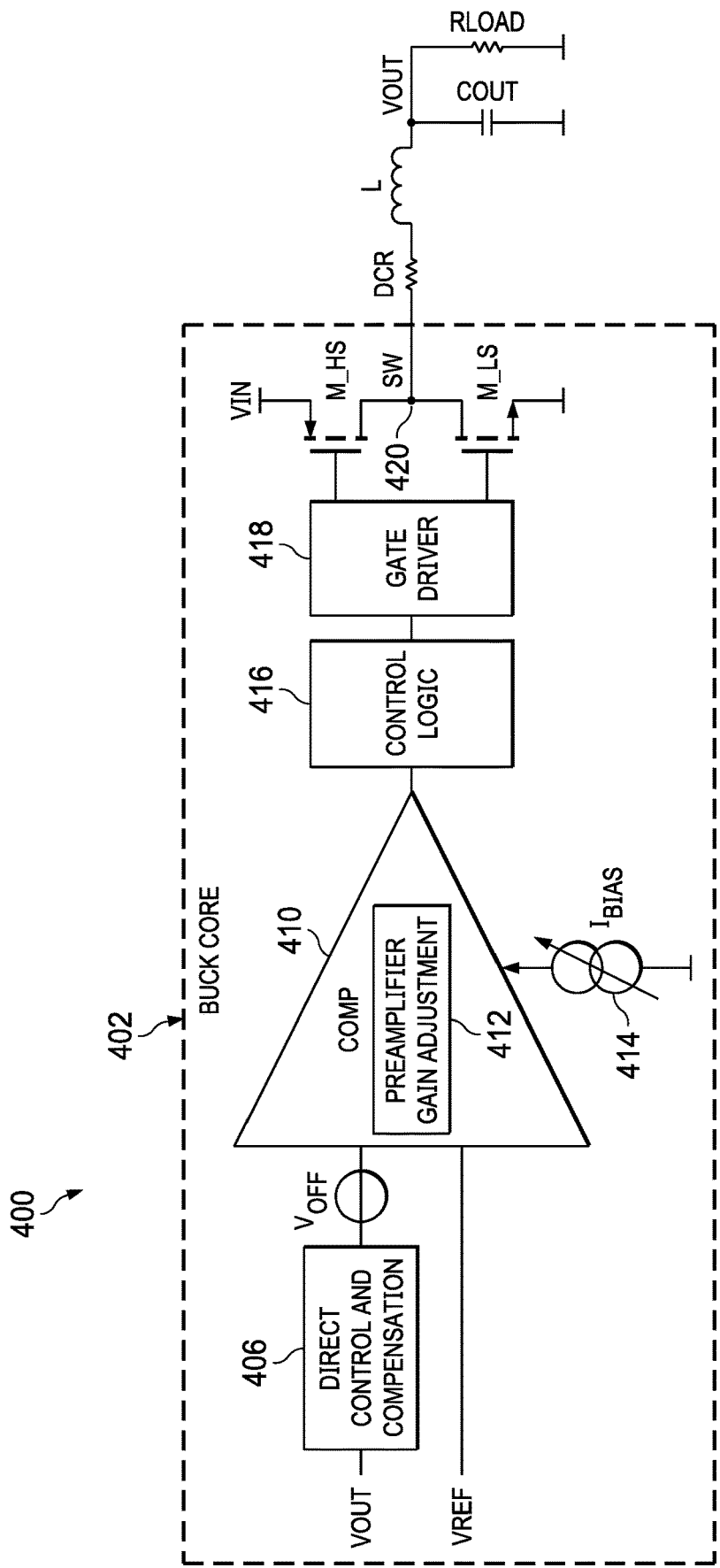
FIG. 4 is a diagram showing a buck converter with offset voltage activation for 100% mode.

In the example buck converter topology 400 of FIG. 4, the buck core 402 includes a comparator 410 with one input configured to receive VOUT+VOFF from a direct control and compensation circuit 406 coupled to the comparator 410. A second input of the comparator 410 receives VREF.

As shown, the comparator 410 also includes a preamplifier gain adjustment circuit 412, which is configured to adjust the preamplifier gain of the comparator 410 as a function of VOFF. The buck core 402 also includes a bias current source 414 coupled to and configured to provide a bias current ($I_{BIAS}$) to the comparator 410. The output of the comparator 410 is received by control logic 416, which is coupled to a gate driver 418. The gate driver 418 provides gate drive signals to a high-side switch (M_HS) and a low-side switch (L_HS) to control different states or phases of the buck converter (e.g., an on-phase, off-phase, a pause phase). The buck converter topology 400 also includes an output inductor (L) and related DC resistance (DCR, where DCR is the amount of resistance for signals with frequencies of or near 0 Hz) coupled to a switch node 420 between M_HS and M_LS. Also, an output capacitor (COUT) and a load (RLOAD) are represented in FIG. 4.

In some examples, VOFF is tens of millivolts and is equal to the overdrive voltage (the difference between feedback voltage and the reference voltage) in 100% mode where VIN equals VOUT. With high overdrive, the current consumption of the comparator 410 is managed using the preamplifier gain adjustment circuit 412 to avoid or reduce an increase in the total quiescent current in 100% mode. Also, the preamplifier gain adjustment circuit 412 improves the load transient and line transient performance, which would otherwise suffer due to the high overdrive voltage causing a high voltage difference between n1$a$ and n1$a\_z$ (see FIG. 2), increasing the propagation delay.

With the preamplifier gain adjustment circuit 412, a high output voltage ripple at light load in 100% mode does not significantly increase the current consumption and propagation delay of the comparator 410. In operation, preamplifier gain adjustment circuit 412 limits the overdrive dependent current. One way to limit the overdrive dependent current is to clamp n1$a$ and n1$a\_z$ so that the voltage does not drop too much. However, this would add parasitic capacitance at these pre-amplified nodes, which would lead to an increased propagation delay time. In addition, a small leakage current (e.g. at high temp) on the preamplifier nodes would increase the offset of the comparator 410, especially for small bias currents in the nA-range. Accordingly, the preamplifier gain adjustment circuit 412 is configured to decrease the preamplifier gain of the comparator 410 depending on the overdrive voltage (the difference between feedback voltage and the reference voltage) at the input of the comparator 410. The advantage is that no parasitic capacitance is added to the sensitive preamplifier nodes. A high overdrive voltage at the input decreases the preamplifier gain and therefore reduces the voltage difference between n1$a$ and n1$a\_z$. A reduced swing at the preamplifier nodes reduces the total current consumption because the maximum current through M13 and M14 is reduced. Another advantage is the increased speed of the comparator 410 out of a high overdrive state due to the limited swing at the preamplifier nodes.

Figure 5:
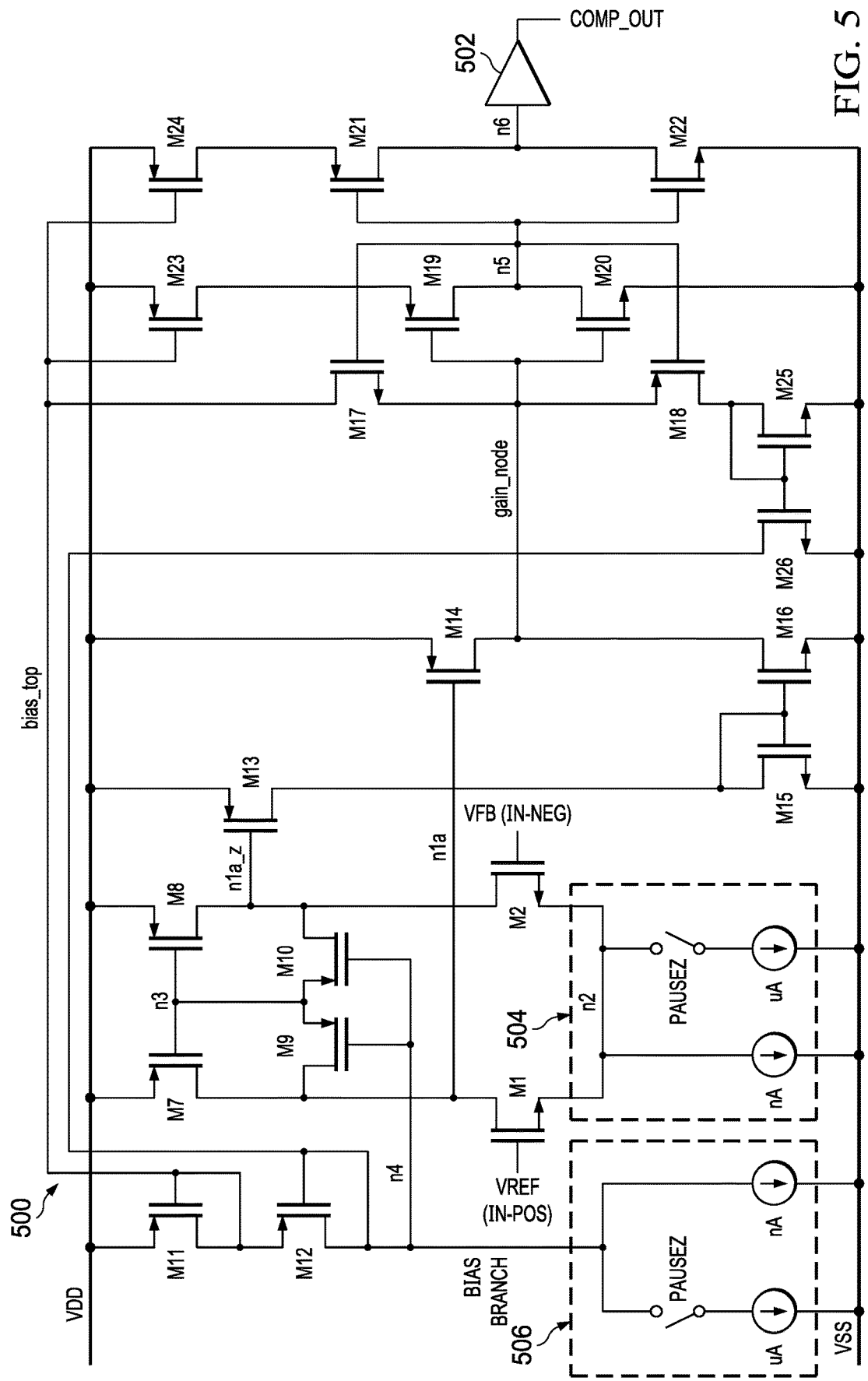
FIG. 5 is a schematic diagram showing a comparator topology with a preamplifier gain adjustment feature.

FIG. 5 is a schematic diagram of a comparator 500 with preamplifier gain adjustment circuitry. Many components of the comparator 500 in FIG. 5 were introduced previously in the discussion of the comparator 200 of FIG. 2. Also, a first bias current source 504 and a second bias current source 506 are labeled in FIG. 5, where each of the first bias current source 504 and the second bias current source 506 provides microampere and nanoampere options. Relative to the comparator 200 of FIG. 2, the comparator 500 of FIG. 5 is different because the drain of M17 is coupled to a bias_top node instead of VDD. In addition, the drain of M18 is coupled to a current mirror (M25 and M26), where the drain of M26 is connected to n4. After a refresh cycle with VFB higher than VREF, the voltage at n1a_z drops and the drain current in M13 and M15 increases. As the voltage at n1a increases, M14 sources less current than is required by M16 and therefore the voltage at the gain_node decreases. Also, M17 operates as a clamp, preventing the gain_node from dropping too low and sourcing the difference between the drain currents of M13 and M14. As the drain of M17 is coupled to the bias_top node, the voltages at bias_top and n4 will drop if the drain current in M17 increases. This increases the gate-source voltage of M9 and M10 decreasing their Ron values and therefore reducing the preamplifier gain. By reducing the preamplifier gain, the voltage swing at n1a_z decreases, reducing the drain current in M13 and also reducing the propagation delay due to the lower voltage swing at n1a_z and n1a.

In 100% mode, VFB is below the reference VREF because VOFF is applied to one of the inputs of the comparator 500 (see also VOFF input to the comparator 410 in FIG. 4). In this case, the voltage at the node n1a_z goes up and the voltage at n1a drops increasing the drain current in M14 and decreasing the drain current in M13, M15 and M16. As the current in M14 is higher than in M16 the voltage at gain_node rises. The clamping device M18 prevents the voltage of gain_node from going up to VDD and sinks the current difference between M14 and M16. The drain current in M18 is mirrored by M25 and M26, where M26 sinks the current from n4, which decreases the voltage at n4, resulting in decreased on-resistance of M9 and M10 and finally decreased preamplifier gain. By reducing the preamplifier gain, the voltage swing at n1a decreases which reduces the drain current in M14 and also reduces the propagation delay due to the lower voltage swing at n1a and n1a_z.

A high overdrive voltage (the difference between feedback voltage and the reference voltage) at the input of the comparator 500 increases the current in the second stage (M13, M14, M15 and M16) and also in the clamping structure of M17 and M18. A drain current in M17 or M18 decreases the voltage at n4, which reduces the on-resistance of M9 and M10 and therefore reduces the preamplifier gain at n1a and n1a_z. Finally, this reduces the current consumption of the second stage and reduces the propagation delay due to the reduced voltage swing at n1a and n1a_z. The voltage at gain_node is buffered using inverter components M19-M22 and buffer circuit 502. As shown, M19 and M21 are coupled to a supply voltage node (VDD) via M23 and M24, where the control terminals of M23 and M24 are coupled to the bias_top node.

The preamplifier gain adjustment feature of the comparator 500 includes the drain of M17 being coupled to the bias_top node instead of VDD, the drain of M18 being coupled to the current mirror formed by M25 and M26, and the drain of M26 being coupled to n4). With the preamplifier gain adjustment feature, the preamplifier gain (Ap) at nodes n1a and n1a_z is still Ap=gm*Ron, where gm is the transconductance of the input pair (M1 and M2) and where Ron is the total on resistance on nodes n1a and n1a_z, which is defined by Ron of M9 and M10. With the preamplifier gain adjustment feature, Ron of M9 and M10 is limited when there is an overdrive voltage (VFB higher than VREF), which reduces current consumption and propagation delay compared to the comparator 200.

The preamplifier gain of the comparator 500 affects the voltage levels at nodes n1a and n1a_z, and the amplifier function of the comparator 500 will output a high or low signal from the comparator based on VDD and the difference between VFB and VREF. If VREF is higher than VFB, the output of the comparator 500 will be high, and the preamplifier gain facilitates faster output of a high value from the comparator 500. On the other hand, if VFB is higher than VREF, the output of the comparator 500 will be low. In such scenarios, the preamplifier gain does not facilitate faster output of a low value from the comparator 500. With the proposed preamplifier gain adjustment features, the preamplifier gain is reduced when VFB is higher than VREF (i.e., when there is an overdrive voltage) to facilitate faster output of a low value from the comparator 500 (reduced propagation delay) and to reduce power consumption of the comparator 500.

Figure 6:
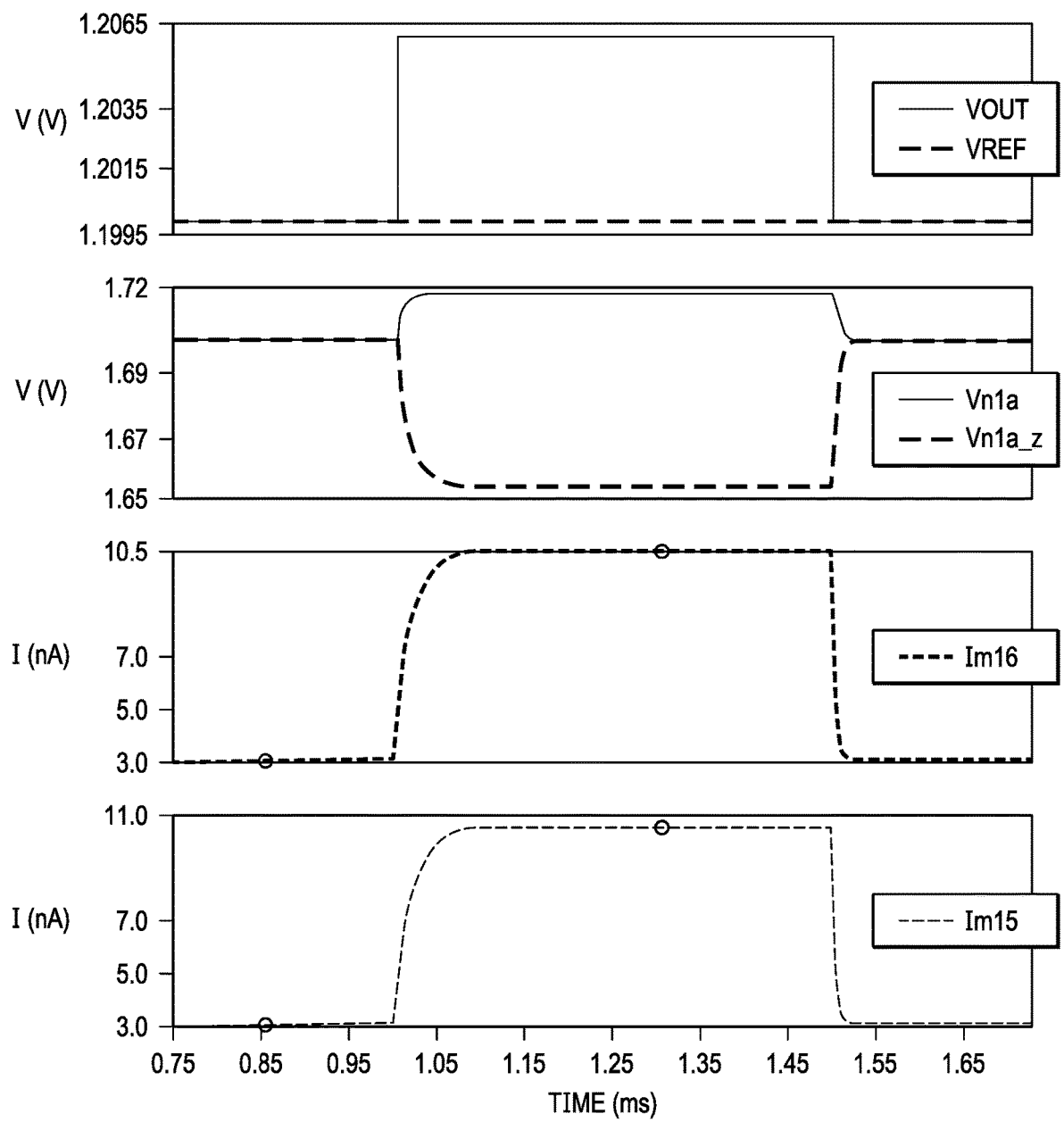
FIG. 6 is a timing diagram showing waveforms related to a comparator topology without the preamplifier gain adjustment feature.
Figure 7:
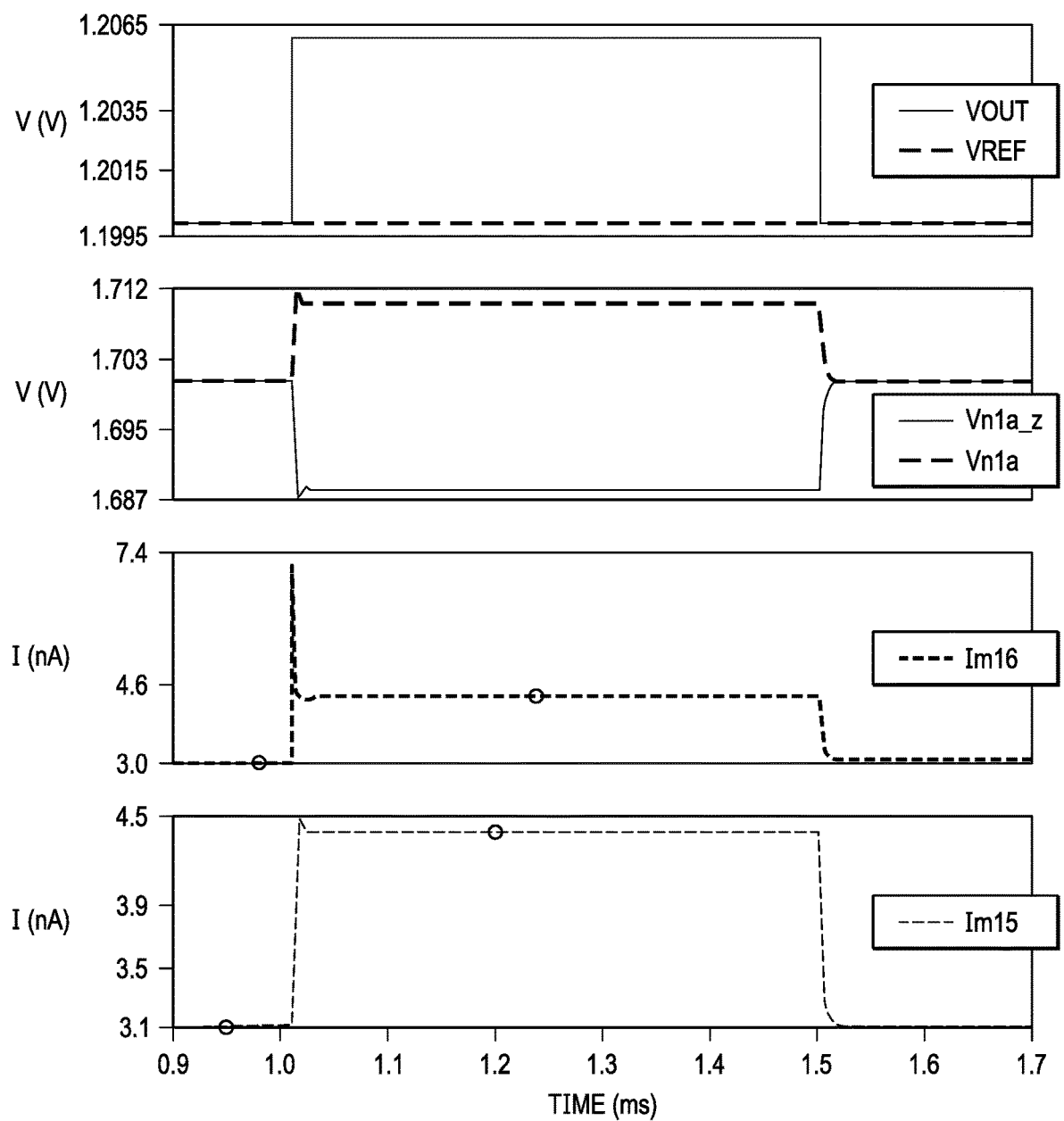
FIG. 7 is a timing diagram showing waveforms related to a comparator topology with the preamplifier gain adjustment feature.

FIG. 6 shows waveforms related to the comparator 200 of FIG. 2 without the proposed preamplifier gain adjustment feature. With an overdrive voltage of 6 mV, the current through M15 and M16 increases from 3 nA to 10 nA. Using the proposed preamplifier gain adjustment feature, an overdrive voltage of 6 mV results in the current through M15 and M16 increasing from 3 nA to only 4.3 nA (see FIG. 7). Besides lower current consumption, the transient performance of a comparator with the preamplifier gain adjustment feature is improved. Also, the propagation delay after a load transient is significantly reduced (compared to a comparator without the proposed preamplifier gain adjustment feature) because the voltage swing at the preamplifier nodes, n1a and n1a_z, is reduced. For this reason also the voltage drop at VOUT is reduced. The disclosed preamplifier gain adjustment feature also improves the rising line transient performance of a comparator (e.g., the comparator 410 in FIG. 4, or the comparator 500 in FIG. 5) in 100% mode. In 100% mode, with VREF much higher than VOUT, a comparator with the preamplifier gain adjustment feature will react faster on a rising line transient and therefore the overshoot of VOUT is reduced. This is due to the reduced voltage swing at the preamplifier nodes, n1a and n1a_z.

Figure 8:
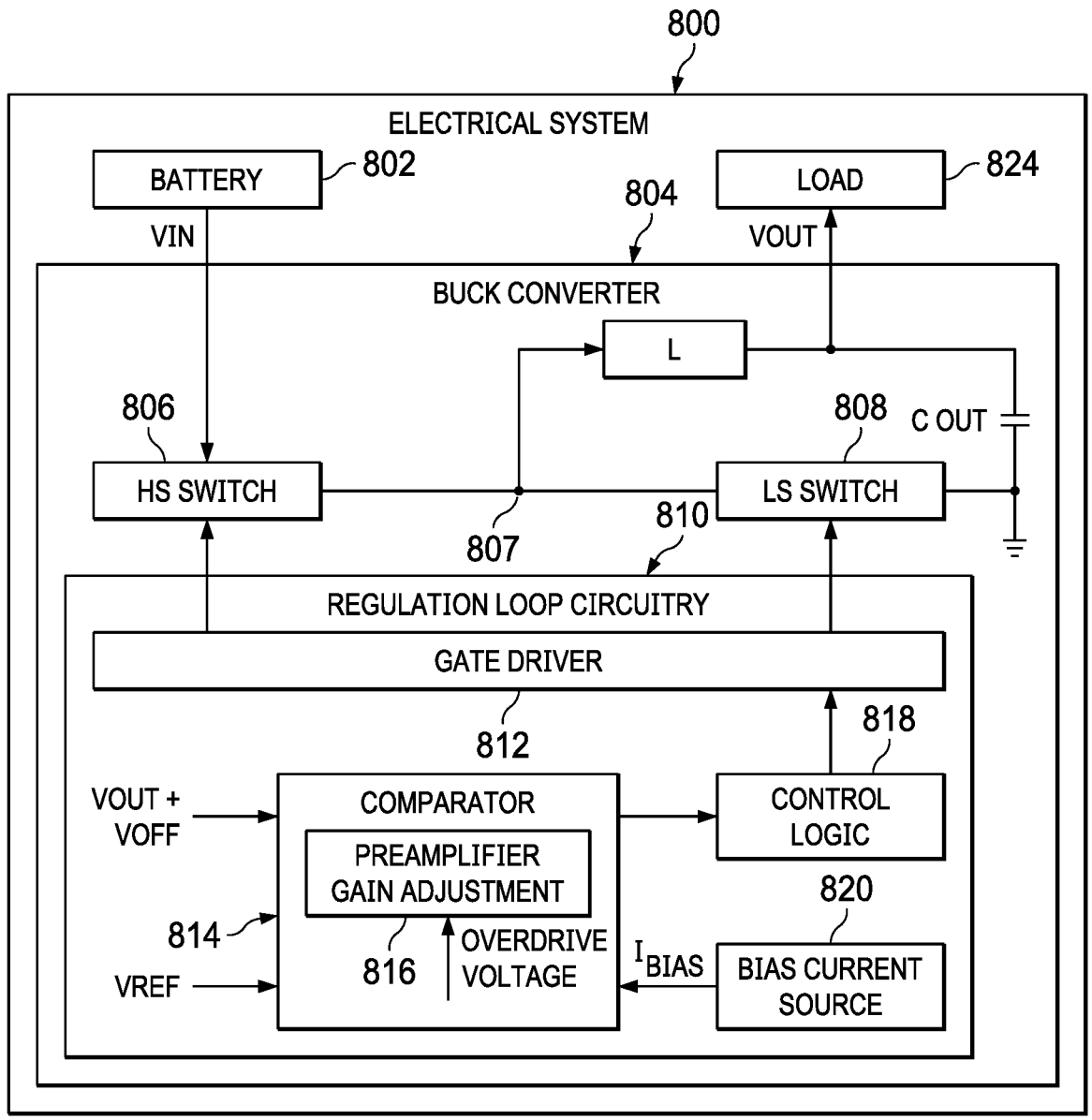
FIG. 8 is a block diagram of an electrical system in accordance with examples of the disclosure.

FIG. 8 is a block diagram of an electrical system 800 in accordance with examples of the disclosure. The electrical system 800 in an example of a battery-powered electronic device, such as a smart phone, a wearable, a tablet computer, or other battery-powered electronic device. As shown, the electrical system 800 includes a battery 802 (e.g., different batteries provide different VINs) coupled to a buck converter 804, where the buck converter 804 provides VOUT to a load 824 based on VIN from the battery 802 (or a regulation circuit between the battery 802 and the buck converter 804).

The buck converter 804 includes a high-side (HS) switch 806 (an example of M_HS in FIG. 4) and a low-side (LS) switch 808 (an example of M_LS in FIG. 4) coupled between the battery 802 and a ground (GND) node. Between the HS switch 806 and the LS switch 808 is a switch (SW) node 807 coupled to a first end of an inductor, L. The second end of L is coupled to the load 824 and to a first (e.g., top) plate of COUT. Also, the second (e.g., bottom) plate of COUT is coupled to GND. In operation, the voltage level at the SW node 807 alternates between VIN or ground, which causes the current in L to ramp up or down to maintain VOUT even as the load 824 varies. More specifically, the SW node 807 is set to VIN during an on-phase state in which the HS switch 806 is on and the LS switch 808 is off. Alternatively, the SW node 807 is set to GND during an off-phase state in which the HS switch 806 off and the LS switch 808 is on. Another control option for the HS switch 806 and the LS switch 808 is a pause state in which both the HS switch 806 and the LS switch 808 are off.

In the example of FIG. 8, the buck converter 804 includes regulation loop circuitry 810 to manage the on-phase state, the off-phase state, and the pause state of the HS switch 806 off and the LS switch 808. To improve efficiency and transient performance of the buck converter 804 in 100% mode, the regulation loop circuitry 810 includes a comparator 814 with a preamplifier gain adjustment circuit 816 (e.g., the preamplifier gain adjustment circuit 412 in FIG. 4, or related components in FIG. 5). In 100% mode, the comparator 814 receives VOUT+VOFF as a first input, and receives VREF as a second input. The comparator 804 also receives $I_{BIAS}$ from a bias current source 820. In operation, the preamplifier gain adjustment circuit 816 adjusts the preamplifier gain based on the overdrive voltage (the difference between feedback voltage and the reference voltage), which corresponds to VOFF. Also, the value of $I_{BIAS}$ may change (e.g., between a nanoampere range and a microampere range) depending on the state of the buck converter 804. For example, in an active mode (when the buck converter is switching to bring VOUT on target), $I_{BIAS}$ may be in a microampere range. As another example, in a pause state (VOUT>VREF and no switching activity), $I_{BIAS}$ may be in a nanoampere range.

In FIG. 8, the output of the comparator 814 is provided to control logic 818. The output of the control logic 818 is provided to a gate driver 812, which operates the HS switch 806 and the LS switch 808 using the on-phase state, the off-phase state, and the pause state described herein.

Using a comparator with a preamplifier gain adjustment feature as described herein provides the advantages of: 1) keeping quiescent current (Iq) low even with large overdrive on the comparator inputs; 2) preventing the current in the second stage from growing significantly; and 3) extending the battery life of portable electronic systems. In a battery-operated system, battery life is limited and VIN will fall over time as a function of power consumption by the load as well as power consumption of the buck converter. As VIN falls, the duty cycle of a buck converter is increased to regulate VOUT. The proposed comparator with a preamplifier gain adjustment feature is one way to reduce power consumption of a buck converter, which will extend the battery life of portable electronic system. Also, it should be noted that the proposed comparator with a preamplifier gain adjustment feature is compatible with other power consumption reduction strategies such as comparator bias current adjustments (e.g., switching between uA or nA bias current options for the comparator depending on different modes). Also, the propagation delay of a comparator with a preamplifier gain adjustment feature as described herein is greatly reduced because the voltage swing at the preamplifier nodes is reduced due to the preamplifier gain being reduced depending on the overdrive voltage of the comparator. This preamplifier gain adjustment feature thus enables the buck converter to run with higher switching frequency. Also, a comparator with a preamplifier gain adjustment feature as described herein improves load-transient performance of a buck converter in sleep mode and improves line-transient performance and load transient performance out of 100% mode.

In some examples, an electrical system (e.g., the electrical system 800 in FIG. 8) includes a buck converter (e.g., the buck converter 804) and a battery (e.g., the battery 802) coupled to an input of the buck converter. The electrical system also includes a load (e.g., the load 824) coupled to an output of the buck converter. The buck converter includes a high-side switch (e.g., the HS switch 806) and a low-side switch (e.g., the LS switch 808). The buck converter also includes regulation loop circuitry (e.g., the regulation loop circuitry 810) coupled to the high-side switch and the low-side switch. The regulation loop circuitry includes a comparator (e.g., the comparator 410 in FIG. 4, the comparator 500 in FIG. 5, or the comparator 814) with preamplifier gain adjustment circuitry (e.g., the preamplifier gain adjustment circuit 412 in FIG. 4, related components in FIG. 5, or the preamplifier gain adjustment circuit 816 in FIG. 8) configured to adjust a preamplifier gain of the comparator based on an overdrive voltage (e.g., the difference between VFB and VREF). In the example comparator 500 of FIG. 5, the preamplifier gain adjustment circuitry corresponds to the current mirror formed by M25 and M26. Also, M17 is coupled to the bias_top node rather than the supply voltage (VDD) node. The preamplifier gain adjustment circuitry is configured to reduce the preamplifier gain as the overdrive voltage increases.

In some examples, the electrical system also includes a direct control and compensation circuit (e.g., the direct control and compensation circuit 406 in FIG. 4) coupled to an input of the comparator, wherein the direct control and compensation circuit is configured to provide an offset voltage (VOFF) to the input in 100% mode of the buck converter. In some examples, the comparator includes a first transistor (e.g., M1 in FIG. 5) with a control terminal coupled to a VREF node, where the first transistor is between a first bias current source (e.g., the first bias current source 504 in FIG. 5) and a first node (e.g., node n1*a* in FIG. 5). The comparator also includes a second transistor (e.g., M2 in FIG. 5) with a control terminal coupled to a VFB node, where the second transistor is between the first bias current source and a second node (e.g., node n1*a*_z in FIG. 5).

The comparator also includes a first current path between a supply voltage (e.g., VDD in FIG. 5) node and a gain node (e.g., gain_node in FIG. 5), wherein the first current path includes a third transistor (e.g., M14 in FIG. 5) with a control terminal coupled to the first node. The comparator also includes a second current path between the supply voltage node and the gain node, wherein the second current path includes a fourth transistor (e.g., M13 in FIG. 5) with a control terminal coupled to the second node. The comparator also includes a second bias current source (e.g., the second bias current source 506 in FIG. 5) coupled to the gain node via a third current path associated with the preamplifier gain adjustment circuitry. In some examples, the third current path includes a current mirror (e.g., M25 and M26 in FIG. 5). Also, the first current path does not include a current mirror, and the second current path includes a current mirror (e.g., M15 and M16). In some examples, the comparator also includes: 1) a fifth transistor (e.g., M7 in FIG. 5) coupled between the supply voltage node and the first node; 2) a sixth transistor (e.g., M8 in FIG. 5) coupled between the supply voltage node and the second node; 3) a fourth current path between the first node and the second node, wherein the fourth current path includes a seventh transistor (e.g., M9 in FIG. 5) and an eighth transistor (e.g., M10 in FIG. 5), wherein control terminals of the fifth and sixth transistors are coupled to a node between the seventh and eighth transistors. The comparator also includes a fifth current path between the second bias current source and the gain node, wherein the fifth current path includes a ninth transistor (e.g., M12 in FIG. 5) and a tenth transistor (e.g., M17 in FIG. 5). A sixth current path of the comparator includes the tenth transistor (e.g., M17 in FIG. 5) and an eleventh transistor (e.g., M11 in FIG. 5), where the sixth current path extends between the supply voltage node and the gain node, and where the current through the tenth transistor controls the gate-to-source voltage (VGS) of the eleventh transistor. A seventh current path of the comparator includes the ninth transistor (e.g., M12 in FIG. 5), the eleventh transistor (e.g., M11 in FIG. 5), and a twelfth transistor (e.g., M26 in FIG. 5), wherein the seventh current path extends between the supply voltage node and a ground node, and where the current through the twelfth transistor controls the VGS of the ninth transistor and the eleventh transistor.

In some examples, an electronic device (e.g., an integrated circuit, die, chip, multi-die module, or other circuit arrangement) includes a buck converter circuit (e.g., the buck converter 804 in FIG. 8) having a gate driver (e.g., the gate driver 812 in FIG. 8) and control logic (e.g., the control logic 818 in FIG. 8) coupled to an input of the gate driver. The buck converter circuit also includes a comparator (e.g., the comparator 410 in FIG. 4, the comparator 500 in FIG. 5, or the comparator 814 in FIG. 8) coupled to an input of the control logic. The buck converter circuit also includes a bias current source (e.g., the first and second bias current sources 504 or 506 in FIG. 5, or the bias current source 820 in FIG. 8) coupled to the comparator and configured to provide a bias current to the comparator. The comparator comprises preamplifier gain adjustment circuitry (e.g., the preamplifier gain adjustment circuit 412 in FIG. 4, related components in FIG. 5, or the preamplifier gain adjustment circuit 816 in FIG. 8) configured to adjust a preamplifier gain of the comparator based on a difference between VFB and VREF. The preamplifier gain adjustment circuitry is configured to reduce the preamplifier gain as the difference between VFB and VREF increases.

In some examples, the comparator includes a first transistor (e.g., M1 in FIG. 5) with a control terminal coupled to a VREF node, where the first transistor is between a first bias current source (e.g., the first bias current source 504 in FIG. 5) and a first node (e.g., node n1a in FIG. 5). The comparator also includes a second transistor (e.g., M2 in FIG. 5) with a control terminal coupled to a VFB node, where the second transistor is between the first bias current source and a second node (e.g., node n1a_z in FIG. 5).

The comparator also includes a first current path between a supply voltage (e.g., VDD in FIG. 5) node and a gain node (e.g., gain_node in FIG. 5), wherein the first current path includes a third transistor (e.g., M14 in FIG. 5) with a control terminal coupled to the first node. The comparator also includes a second current path between the supply voltage node and the gain node, wherein the second current path includes a fourth transistor (e.g., M13 in FIG. 5) with a control terminal coupled to the second node. The comparator also includes a second bias current source (e.g., the second bias current source 506 in FIG. 5) coupled to the gain node via a third current path associated with the preamplifier gain adjustment circuitry. In some examples, the third current path includes a current mirror (e.g., M25 and M26 in FIG. 5). Also, the first current path does not include a current mirror, and the second current path includes a current mirror (e.g., M15 and M16). In some examples, the comparator also includes: 1) a fifth transistor (e.g., M7 in FIG. 5) coupled between the supply voltage node and the first node; 2) a sixth transistor (e.g., M8 in FIG. 5) coupled between the supply voltage node and the second node; 3) a fourth current path between the first node and the second node, wherein the fourth current path includes a seventh transistor (e.g., M9 in FIG. 5) and an eighth transistor (e.g., M10 in FIG. 5), wherein control terminals of the fifth and sixth transistors are coupled to a node between the seventh and eighth transistors. The comparator also includes a fifth current path between the second bias current source and the gain node, wherein the fifth current path includes a ninth transistor (e.g., M12 in FIG. 5) and a tenth transistor (e.g., M17 in FIG. 5). A sixth current path of the comparator includes the tenth transistor (e.g., M17 in FIG. 5) and an eleventh transistor (e.g., M11 in FIG. 5), where the sixth current path extends between the supply voltage node and the gain node, and where the current through the tenth transistor controls the gate-to-source voltage (VGS) of the eleventh transistor. A seventh current path of the comparator includes the ninth transistor (e.g., M12 in FIG. 5), the eleventh transistor (e.g., M11 in FIG. 5), and a twelfth transistor (e.g., M26 in FIG. 5), wherein the seventh current path extends between the supply voltage node and a ground node, and where the current through the twelfth transistor controls the VGS of the ninth transistor and the eleventh transistor.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An electrical system, comprising:
   a buck converter having an input and an output;
   a battery coupled to the input of the buck converter;
   a load coupled to the output of the buck converter, the buck converter including:
      a high-side switch;
      a low-side switch; and
      regulation loop circuitry coupled to the high-side switch and the low-side switch, the regulation loop circuitry including:
         a comparator with preamplifier gain adjustment circuitry configured to adjust a preamplifier gain of the comparator based on an overdrive voltage, the preamplifier gain adjustment circuitry is configured to reduce the preamplifier gain as the overdrive voltage increases.

2. The electrical system of claim 1, including a direct control and compensation circuit coupled to an input of the comparator, the direct control and compensation circuit is configured to provide an offset voltage to the input in 100% mode of the buck converter.

3. The electrical system of claim 1, in which the comparator includes:
   a first transistor with a control terminal coupled to a reference voltage (VREF) node, the first transistor is between a first bias current source and a first node;
   a second transistor with a control terminal coupled to a feedback voltage (VFB) node, the second transistor is between the first bias current source and a second node;
   a first current path between a supply voltage node and a gain node, the first current path includes a third transistor with a control terminal coupled to the first node;

a second current path between the supply voltage node and the gain node, the second current path includes a fourth transistor with a control terminal coupled to the second node; and
a second bias current source coupled to the gain node via a third current path associated with the preamplifier gain adjustment circuitry.

4. The electrical system of claim 3, in which the third current path includes a current mirror.

5. The electrical system of claim 3, in which the first current path does not include a current mirror, and the second current path includes a current mirror.

6. The electrical system of claim 3, in which the comparator includes:
a fifth transistor coupled between the supply voltage node and the first node;
a sixth transistor coupled between the supply voltage node and the second node;
a fourth current path between the first node and the second node, the fourth current path includes a seventh transistor and an eighth transistor, and
control terminals of the fifth and sixth transistors are coupled to a node between the seventh and eighth transistors.

7. The electrical system of claim 6, in which the comparator includes:
a fifth current path between the second bias current source and the gain node, the fifth current path includes a ninth transistor and a tenth transistor;
a sixth current path that includes the tenth transistor and an eleventh transistor, the sixth current path extends between the supply voltage node and the gain node; and
a seventh current path that includes the ninth transistor, the eleventh transistor, and a twelfth transistor, the seventh current path extends between the supply voltage node and a ground node.

8. An electronic device, comprising:
a buck converter circuit having:
a gate driver having an input;
control logic having an input and having an output coupled to the input of the gate driver;
a comparator, having an output coupled to the input of the control logic, including a first input adapted to receive a reference voltage (VREF) and a second input adapted to receive a feedback voltage (VFB); and
a bias current source coupled to the comparator and configured to provide a bias current to the comparator,
the comparator including preamplifier gain adjustment circuitry configured to adjust a preamplifier gain of the comparator based on a difference between VFB and VREF, the preamplifier gain adjustment circuitry is configured to reduce the preamplifier gain as the difference between VFB and VREF increases.

9. The electronic device of claim 8, in which the comparator includes:
a first transistor with a control terminal coupled to a VREF node, the first transistor is between a first bias current source and a first node;
a second transistor with a control terminal coupled to a VFB node, the second transistor is between the first bias current source and a second node;
a first current path between a supply voltage node and a gain node, the first current path includes a third transistor with a control terminal coupled to the first node;
a second current path between the supply voltage node and the gain node, the second current path includes a fourth transistor with a control terminal coupled to the second node; and
a second bias current source coupled to the gain node via a third current path associated with the preamplifier gain adjustment circuitry.

10. The electronic device of claim 9, in which the third current path includes a current mirror.

11. The electrical system of claim 9, in which the first current path does not include a current mirror, and the second current path includes a current mirror.

12. The electrical system of claim 9, in which the comparator includes:
a fifth transistor coupled between the supply voltage node and the first node;
a sixth transistor coupled between the supply voltage node and the second node;
a fourth current path between the first node and the second node, the fourth current path includes a seventh transistor and an eighth transistor, and
control terminals of the fifth and sixth transistors are coupled to a node between the seventh and eighth transistors.

13. The electrical system of claim 9, in which the comparator includes:
a fifth current path between the second bias current source and the gain node, the fifth current path includes a ninth transistor and a tenth transistor;
a sixth current path that includes the tenth transistor and an eleventh transistor, the sixth current path extends between the supply voltage node and the gain node; and
a seventh current path that includes the ninth transistor, the eleventh transistor, and a twelfth transistor, the seventh current path extends between the supply voltage node and a ground node.

14. A comparator circuit, comprising: a first transistor with a control terminal coupled to a VREF node, the first transistor is coupled between a first bias current source and a first node; a second transistor with a control terminal coupled to a VFB node, the second transistor is coupled between the first bias current source and a second node; a first current path between a supply voltage node and a gain node, the first current path includes a third transistor with a control terminal coupled to the first node; a second current path between the supply voltage node and the gain node, the second current path includes a fourth transistor with a control terminal coupled to the second node; and a second bias current source coupled to the gain node via a third current path associated with the preamplifier gain adjustment circuitry, in which the third current path includes a current mirror.

15. The comparator circuit of claim 14, in which the first current path does not include a current mirror, and the second current path includes a current mirror.

16. The comparator circuit of claim 14, including:
a fifth transistor coupled between the supply voltage node and the first node;
a sixth transistor coupled between the supply voltage node and the second node;
a fourth current path between the first node and the second node, the fourth current path includes a seventh transistor and an eighth transistor, and
control terminals of the fifth and sixth transistors are coupled to a node between the seventh and eighth transistors.

17. The comparator circuit of claim 14, including:
a fifth current path between the second bias current source and the gain node, the fifth current path includes a ninth transistor and a tenth transistor;
a sixth current path that includes the tenth transistor and an eleventh transistor, the sixth current path extends between the supply voltage node and the gain node; and
a seventh current path that includes the ninth transistor, the eleventh transistor, and a twelfth transistor, the seventh current path extends between the supply voltage node and a ground node.

18. A comparator circuit comprising: (a) a VDD terminal, a VSS terminal, a reference input, a feedback input, and a comparator output; (b) a series coupling of a first transistor, a second transistor, and a current source between the VDD terminal and the VSS terminal; (c) a clamp circuit including a series coupling of a third transistor and a fourth transistor, the third transistor having a terminal coupled to between the first transistor and the second transistor, the clamp circuit coupling the reference input and the feedback input to the comparator output; and (d) a current mirror including: a fifth transistor having a first terminal coupled to between the second transistor and the current source and a second terminal coupled to the VSS terminal; and a sixth transistor having a first terminal coupled to the fourth transistor and a second terminal coupled to the VSS terminal.

19. The comparator circuit of claim 18 including a preamplifier stage coupled to the reference input and the feedback input, and a preamplifier gain adjustment stage coupled between the preamplifier stage and the comparator output, the preamplifier gain adjustment stage including the clamp circuit and the current mirror.

20. The comparator circuit of claim 18 including:
(a) control logic having an input coupled to the comparator output and having a logic output;
(b) gate driver circuitry having an input coupled to the logic output, having a high side driver output, and having a low side driver output;
(c) a switch node;
(d) a high side transistor having a gate coupled to the high side driver output, having a supply terminal, and having a switch terminal coupled to the switch node; and
(e) a low side transistor having a gate coupled to the low side driver output, having a ground node terminal, and having a switch terminal coupled to the switch node.

21. The comparator circuit of claim 20 including:
(a) a battery coupled to the supply terminal;
(b) a load having an input; an
(c) an inductor having a first terminal coupled to the switch node and a second terminal coupled to the load input and to the feedback input.

22. The comparator circuit of claim 20 in which the switch node is coupled to the feedback input.

* * * * *